United States Patent [19]

Foley et al.

[11] 4,273,393
[45] Jun. 16, 1981

[54] AUTOMATIC COMPONENT DISPENSOR

[75] Inventors: Michael S. Foley, Beverly; Mark V. Pierson, Lynn, both of Mass.

[73] Assignee: USM Corporation, Farmington, Conn.

[21] Appl. No.: 76,975

[22] Filed: Sep. 20, 1979

[51] Int. Cl.³ .......................... A47F 5/02; H05K 13/04
[52] U.S. Cl. .................................. 312/97.1; 312/135; 312/202; 29/566.3
[58] Field of Search ................ 312/97, 97.1, 135, 202, 312/234, 252, 254; 29/566.3, 714, 721, 624

[56] References Cited

U.S. PATENT DOCUMENTS

| 3,710,477 | 1/1973 | Frawley | 29/721 |
| 3,859,707 | 1/1975 | Ragard et al. | 29/566.3 |
| 3,992,068 | 11/1976 | Galton | 312/135 |

FOREIGN PATENT DOCUMENTS 2804071  9/1978  Fed. Rep. of Germany .......... 312/97.1

*Primary Examiner*—Casmir A. Nunberg
*Attorney, Agent, or Firm*—Owen J. Meegan

[57] ABSTRACT

A dispensing device for small parts arranged in a compact shape from when the parts can be withdrawn from a single point including a plurality of vertically stacked trays slidably disposed upon banks of spaced flanges which are rotatable about a central axis of the device and reciprocable in a plane parallel to the central axis. The uppermost and lowermost trays in the stack are free to rotate with the flanges and the balance of the trays are restrained from rotation so as to be disengaged from one bank of flanges and received between the planes of another bank of flanges.

9 Claims, 3 Drawing Figures

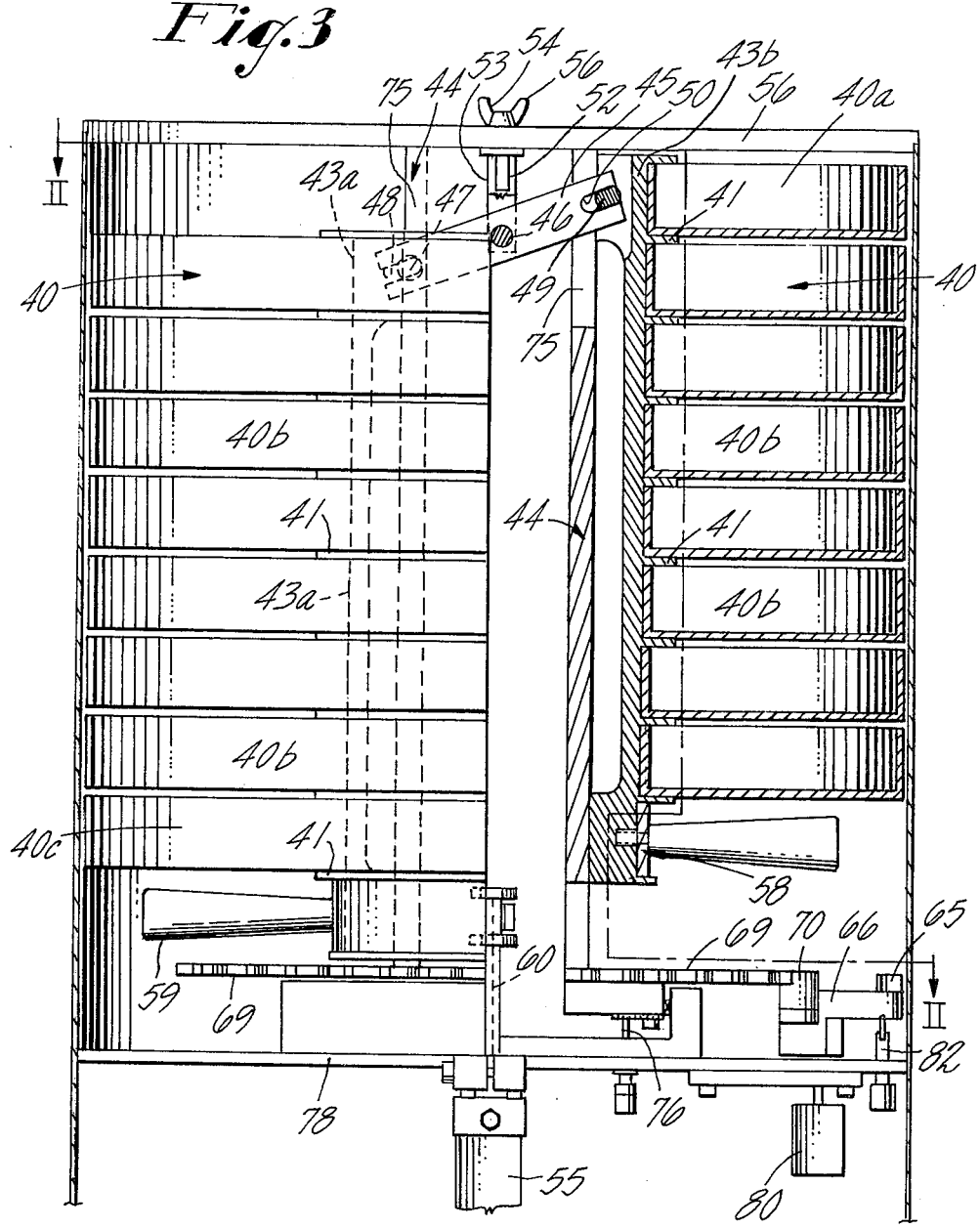

AUTOMATIC COMPONENT DISPENSOR

BACKGROUND OF THE INVENTION

1. Field of the Invention

The present invention relates to dispensing devices and particularly to dispensing devices for automatically delivering a variety of sequentially stored electronic components for manual insertion into circuit boards.

2. Prior Art

Storage and retrieval of various types of small parts is required in industries that assemble equipment. Specifically, small printed circuit board components are sometimes assembled in a hand-feed operation in which the loading and retrieval of different small parts is required during a sequence of operations. With many of the dispensing devices currently used, a considerable amount of time is required for an assembler to select the part to be inserted and then return unused parts to the proper storage compartments. When dozens of components must be assembled on a single board, the time to perform these operations can be extended considerably. Many of the dispensing devices currently in use involve systems in which an assembler must reach into a bin, remove a part and then move the bin to a new location so that another part can be removed. Other systems involve bins which are moved automatically but require the assembler to shift the point of removal from one place to another. When the delivery point is changed for each component, the assembler must perform the time-consuming function of searching out a correct position which continuously changes.

STATEMENT OF THE INVENTION

According to the present invention we have discovered a dispensing device which comprises at least two semi-circular banks of spaced flanges, flanges of one bank being arranged to reciprocate into coplanar relationships with flanges of another bank. A plurality of stacked semi-circular trays having radially arranged compartments formed therein are slidably disposed between and supported by the flanges. The banks of flanges are indexed about an axis carrying with them a single tray that is supported between the top flanges of one bank and a single tray that is supported between the bottom flanges of the other bank. A tray is disposed on each flange between the top and bottom sets of flanges and these intermediate trays are restrained against movement with the flanges so as to be transferred from one bank to the other bank during the indexing of the top and bottom trays. When the banks of flanges are aligned with each stack of trays, the banks of flanges can be reciprocated in alternate directions parallel to each other by means of an air actuated rocker arm that simultaneously moves one bank down from the uppermost dispensing location while the other bank is moved upwardly to a dispensing location. The top and bottom trays and the banks of flanges rotate about the central support through a geneva mechanism that is driven by a motor and actuated by a switch. The trays intermediate the top and bottom of the banks are restrained against rotation with the flanges by one or more pins that are disposed in holes in a support column. These pins abut the lead edges of the trays and since the trays are slidably supported by the flanges, the flanges will continue to rotate while the trays remain in the fixed position so as to be received between opposed banks of flanges. The pins adjacent the top and bottom trays are removed so as to allow these trays to rotate with the banks of flanges. When the top tray has been rotatably indexed to a point where the edges of all trays are aligned with the edges of the banks of flanges, the latter can be reciprocated and another tray will be presented for indexing.

BRIEF SUMMARY OF THE DRAWINGS

FIG. 3 is an elevational view, partially in cross-section, of the dispensing device, taken along the lines III—III of FIG. 2.

DESCRIPTION OF THE PREFERRED EMBODIMENTS

Figure 1:
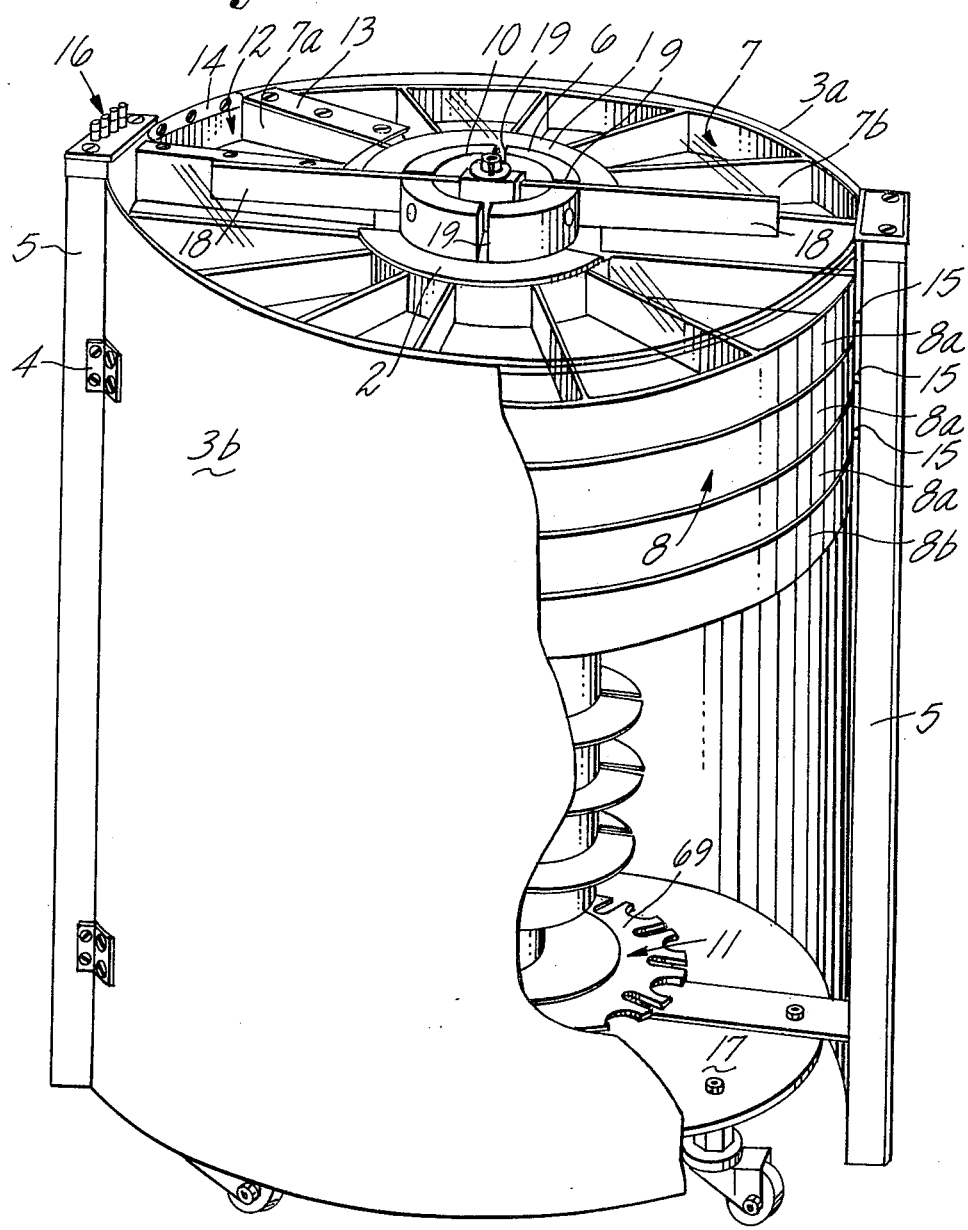
FIG. 1 is a perspective view, partially broken away, of the dispensing device according to the present invention.

Turning now to FIG. 1, the dispensing device includes a first bank of semi-circular flanges 1 and a second bank of similar flanges 2 which are arranged to reciprocate axially in opposite directions into coplanar relationships by means of a pneumatic air cylinder (not shown). These banks of flanges are spaced apart so as to receive therebetween and support a plurality of stacked semi-circular trays 7 and 8 which are housed in a generally cylindrical case having sides 3a and 3b. The exterior semi-circular sides of the trays engage the interior of the case 3a and 3b to keep the trays in place on the flanges during operation of the equipment. In order to remove trays and gain access to the equipment, side 3b of the case is hinged at 4 on support columns 5, as is side 3a (not shown).

The banks of flanges 1 and 2 are slidably disposed upon a central support 6 which extends from the base plate 17 of the equipment to a cover (not shown). An upper key 18 extends radially from the central support 6 through slots 9 which are formed therein and engage the flat edge surfaces of the top tray in stack 7. The upper key 18 revolves as the central support 6 is turned through a geneva mechanism 11, as will be explained later. As the upper key 18 revolves, it rotates the uppermost tray of stack 7 disposed upon the first bank of flanges 1 in a counter-clockwise direction so as to index a compartment 7a beneath opening 12 in the top of the dispensing device (the cover not being shown). The opening 12 can be formed with a resilient flap 13 and strengthening member 14 attached to the cover so as to eliminate spillover of components into adjacent compartments.

Trays 8a are slidably disposed upon the second bank of flanges 2 but are restrained against rotation by pins 15 which are removablely disposed in support column 5. As central support 6 revolves one bank of flanges slides out of supporting engagement while the other bank slides into engagement. Pins are not disposed in support column 5 adjacent lowermost tray 8b and it will revolve with the central support due to the urging of a lower key (see FIG. 3) attached to the bank of flanges 1. Simultaneously with the turning of lowermost tray 8b on bank 2, uppermost tray 7 on bank 1 turns. In the example shown in the drawings, tray 7 has a first compartment 7a presented in the window 12. The compartments of the top tray 7 are sequentially indexed along with the bank of flanges 1 by control buttons 16 which are connected in a conventional manner to the driving mechanisms of the dispenser. After the last compartment 7b has been indexed past window 12, the first bank of flanges 1 will be fully moved 180° to the previous location at the second bank of flanges 2, and visa versa. At that point, the first bank of flanges 1 is moved down to retract the previous tray while simultaneously the second bank of flanges 2 is moved up so as to raise the second tray into the dispensing plane. Such movement is accomplished by action of a rocker arm 45 (FIG. 3) pivoted upon bracket 10.

Referring now to FIG. 3, the semi-circular trays 40 are disposed upon flanges 41 that extend from tray slides 43a and 43b. In turn, tray slides 43a and 43b are disposed about a central support 44 and the tray slides 43a and 43b rotate about the support and reciprocate axially of it. Movement of the tray slides in planes parallel to the axis of rotation is accomplished by extending or retracting cylinder rod 60 which is attached to air cylinder 55, the latter being fixed to base 78. When tray slide 43a is raised by extension of the cylinder rod 60 (to which it is attached), tray slide 43b will be lowered due to the action of rocker arm 45. Rocker arm 45 is pivoted on pin 46 and the upward movement of tray slide 43a carries a pin 47 attached thereto to slide within track 48 causing pin 49 to slide within track 50 in the opposite direction. The distal ends of rocker arm 45 slide within slots 75 in the support 44 (see element 19 in FIG. 1) which are spaced 180° apart. Retraction of cylinder rod 60 causes tray slide 43a to lower which in turn raises tray slide 43b.

Rotation of the trays is accomplished through the geneva mechanism including a star wheel 69 which is attached to central support 44. Each of the trays 40 is slidably supported between flanges 41 of a bank so that a flange is free to turn with respect to the tray, even though the tray supported by it is restrained against rotation. Uppermost tray 40a on tray slide 43b and lowermost tray 40c on tray slide 43a each turn with the supporting banks of flanges due to the engagement therewith of upper key 52 and lower key 58 respectively. Trays 40b, which are the intermediate trays disposed between trays 40a and 40c, are restrained against rotation by pins 82 (see FIG. 2) which abut the flat lead edges thereof. A second lower key 59 is attached to the slide tray 43a so that as the slide trays are reciprocated, a key will be available to engage the then lowermost tray.

Each of the lower keys 58 and 59 are releasably secured to the outside of the lowermost-used, lead ends of the tray slides 43b and 43a respectively. Handles are conveniently provided so as to enable an operator to easily move the keys heightwise from one flange to another as more or less trays are used in the equipment.

The upper key 52 is carried in slots 77 (see FIG. 2) in central support 44 as indicated previously. A bracket 53 is attached to upper key 52 and carries pin 46 that supports rocker arm 45. A nut 56 threaded to a bolt carried by bracket 53 holds cover 56 on the dispenser.

Figure 2:
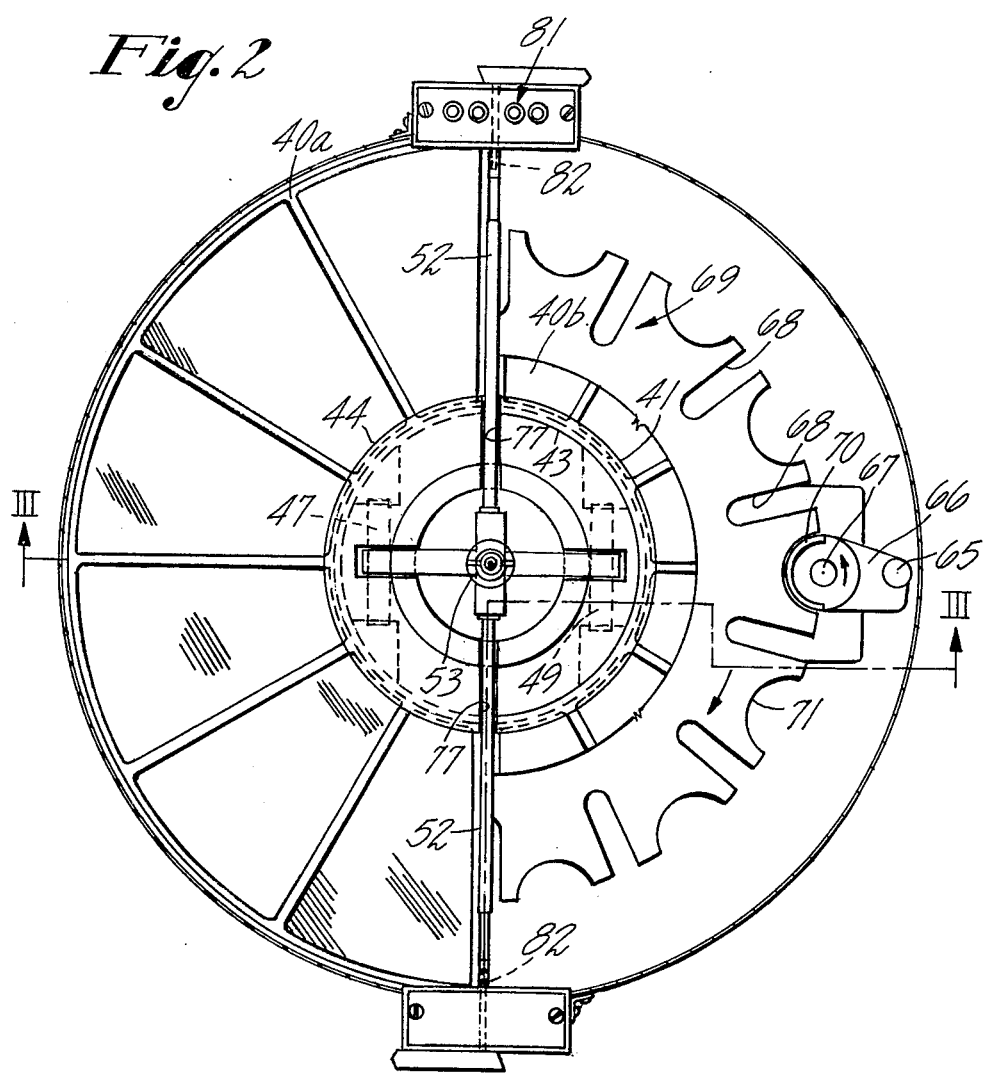
FIG. 2 is a top view, partially in cross-section, of the dispensing device taken along the lines II—II of FIG. 3.

Indexing of trays 40a and 40c is accomplished by means of a geneva drive as best seen in FIG. 2. A pin 65 is disposed upon a drive lever 66 and orbits about an axis 67 to be received in slots 68 formed in a star wheel 69. The star wheel in this embodiment is formed with twelve slots 68 to accommodate twelve index positions for dispensing operations. The pin 65 fits into slots 68 and advances star wheel 69 by one step which is equivalent to advancing a compartment in the tray. A cam surface 70 disposed upon drive lever 66 revolves within a similarly shaped recess 71 to stabilize the star wheel after indexing. The cam surface 70 is semi-circular so as to allow the star wheel 69 to pass by the missing portion as pin 65 slides into and out of slot 68. Drive lever 66 is operated by means of a conventional electric motor 80 that may be controlled either by buttons 81 or from a program which automatically indexes the equipment one or more positions, either forward or backward. Generally, after the drive lever 65 has revolved once (and thus advanced a tray by one compartment), it will trip a switch 82 (see FIG. 3) which stops the movement until a new signal is supplied.

In the position as shown in FIG. 2, the trays 40a and 40b have been indexed into a stage where both banks of flanges are aligned with the edges of the trays and the equipment is ready for reciprocation as described previously. The topmost tray 40 will be reciprocated upwardly with flanges 41 of slide 43b to the position 40a as seen in FIG. 3. As previously mentioned, flanges 41 are fixed to tray slide 43b which in turn is pivotally connected to rocker arm 45 by means of pin 49. At the same time as flanges 41 of slide 43b are reciprocated upwardly, the flanges on the other bank on slide 43a are reciprocated downwardly. In order to prevent reciprocation of the lever arm when the trays are not in aligned relationships to the flanges, an interlock 76 (shown in FIG. 3) is disposed beneath the star wheel 69 and will allow reciprocation only when the trays are in an appropriate position.

It is apparent that modifications and changes can be made within the spirit and scope of the present invention but it is our intention only to be limited by the scope of the appended claims.

We claim:

1. A dispensing device comprising:
   at least two banks of flanges, flanges of one bank being arranged to reciprocate into coplanar relationships with flanges of the other bank;
   a plurality of stacked trays having compartments formed therein, slidably disposed upon and supported by said flanges;
   means to index simultaneously the top tray supported on the one bank of flanges and the bottom tray supported on the other bank of flanges; and
   means to restrain indexing of intermediate trays disposed below said top tray on said one bank and above said bottom tray on said other bank whereby said intermediate trays will index from one bank to the other bank.

2. The device according to claim 1 wherein said banks are rotatably disposed about a central support means.

3. The device according to claim 2 further including means to reciprocate said banks of flanges whereby when the trays are fully on one bank or the other, said top tray can be lowered while simultaneously said bottom tray can be raised.

4. The device according to claim 1 wherein the means to restrain indexing of trays includes a plurality of removable retaining means arranged so as to be disposed in each of the spaces between adjacent flanges to abut said trays.

5. The device according to claim 2 wherein in the means to index the top tray includes a key disposed normal to the axis of rotation and extending outwardly from said central support means to engage the sides of the top tray and index the compartments of said top tray to a dispensing station.

6. The device according to claim 1 further including means for retaining said trays upon said flanges during operation of the device.

7. The device according to claim 6 wherein the retaining means includes a housing having a generally cylindrical internal shape arranged to slidably engage the perimeter of said trays.

8. The device according to claim 1 further including a top disposed over said stacked trays and means defining an aperature in a fixed location in said top, whereby an operator can reach through said aperature into the tray and remove an article contained therein.

9. A dispensing device comprising:
at least two tray slides centrally disposed within said device and arranged together in a cylindrical form; at least two banks of flanges, flanges of one bank being arranged to reciprocate into coplanar relationships with flanges of the second bank, one of said banks being disposed on one of the tray slides and the other being disposed on the other tray slide;
means to index said tray slides about a central axis;
a plurality of trays slidably supported on each of said banks of flanges;
means to index simultaneously the top tray supported by one of the banks of flanges and the bottom tray supported on the other bank of flanges and means to restrain indexing of trays disposed intermediate said top and bottom trays;
means to reciprocate said tray slides in opposite directions in planes parallel to the central axis.

* * * * *